(12) United States Patent
Diessenbacher

(10) Patent No.: US 11,793,122 B2
(45) Date of Patent: Oct. 24, 2023

(54) PLANT PALLET

(71) Applicant: WeGrow Germany GmbH, Tönisvorst (DE)

(72) Inventor: Peter Diessenbacher, Krefeld (DE)

(73) Assignee: WeGrow Germany GmbH, Tönisvorst (DE)

( * ) Notice: Subject to any disclaimer, the term of this patent is extended or adjusted under 35 U.S.C. 154(b) by 295 days.

(21) Appl. No.: 17/424,297

(22) PCT Filed: Jan. 6, 2020

(86) PCT No.: PCT/EP2020/050137
§ 371 (c)(1),
(2) Date: Jul. 20, 2021

(87) PCT Pub. No.: WO2020/151933
PCT Pub. Date: Jul. 30, 2020

(65) Prior Publication Data
US 2022/0087115 A1  Mar. 24, 2022

(30) Foreign Application Priority Data
Jan. 21, 2019 (EP) ..................................... 19152899

(51) Int. Cl.
*A01G 9/029* (2018.01)

(52) U.S. Cl.
CPC .................................. *A01G 9/0295* (2018.02)

(58) Field of Classification Search
CPC .... A01G 9/0295; A01G 9/0297; A01G 9/029; A01G 9/028; A01G 9/02; B65D 2501/24261

USPC ......................................................... 220/518
See application file for complete search history.

(56) References Cited

U.S. PATENT DOCUMENTS

| | | | | |
|---|---|---|---|---|
| 4,329,813 A * | 5/1982 | Halttula | ............... | A01G 9/0295 206/505 |
| 2008/0078119 A1* | 4/2008 | Hansen | ................ | A01G 9/0297 47/66.5 |
| 2009/0119987 A1* | 5/2009 | Ingrassia | ................ | A01G 9/028 47/66.5 |
| 2016/0174470 A1 | 6/2016 | Shaffer et al. | | |
| 2022/0159915 A1* | 5/2022 | Ayres | .................. | A01G 9/0297 |
| 2023/0116228 A1* | 4/2023 | Xiong | .................. | A01G 27/005 47/85 |

FOREIGN PATENT DOCUMENTS

| | | |
|---|---|---|
| CN | 2935786 Y | 8/2007 |
| DE | 3427704 A1 * | 1/1986 |
| DE | 9205808 U1 * | 9/1992 |

(Continued)

*Primary Examiner* — Kristen C Hayes
(74) *Attorney, Agent, or Firm* — Calderon, Safran & Cole P.C.

(57) ABSTRACT

A plant pallet has a plurality of wells arranged in rows and columns to receive leafy tree seedlings. The wells each have a well bottom with at least one drainage opening. The well bottom of each well merges laterally into a peripheral side wall. A top side of the plant pallet is formed by side walls of adjacent wells merging into one another. To prevent lateral rooting being impaired or adversely affected by the side wall, protrusions which extend further upwards are arranged on the top side such that they partially continue the side walls upwards.

18 Claims, 4 Drawing Sheets

(56) References Cited

FOREIGN PATENT DOCUMENTS

| | | | |
|---|---|---|---|
| DE | 9319024 | U1 * | 5/1994 |
| EP | 0205330 | A2 | 12/1986 |
| FR | 962699 | A * | 6/1950 |
| FR | 2050570 | A5 * | 4/1971 |
| FR | 2639508 | A1 * | 6/1990 |
| KR | 20170001665 | U | 5/2017 |
| WO | WO2018229486 | A1 | 12/2018 |

* cited by examiner

PLANT PALLET

CROSS-REFERENCE TO RELATED APPLICATIONS AND CLAIM TO PRIORITY

This application is a national stage application of International Application No. PCT/EP2020/050137 filed Jan. 6, 2020, which claims priority to European Patent Application No. 19152899.1 filed Jan. 21, 2019, the disclosures of which are incorporated herein by reference and to which priority is claimed.

FIELD OF THE INVENTION

The invention relates to a plant pallet having a multiplicity of wells which for receiving foliated small tree seedlings are disposed in rows and columns, wherein the wells have in each case a well base having at least one dewatering opening, and wherein the well base of each well laterally transitions to an encircling lateral wall, and an upper side of the plant pallet is formed by mutually transitioning lateral walls of adjacent wells. The lateral wall here can comprise a plurality of lateral faces.

BACKGROUND OF THE INVENTION

Plant pallets of the type in which tree seedlings having a lower soil region and an upper shoot are disposed are known in practice. The soil region is inserted into the well, wherein the height of the lateral wall in known plant pallets corresponds to approximately the height of the soil region.

It is disadvantageous here that lateral rooting through the lateral wall is impeded/compromised, the latter to be avoided by the invention.

In a plant pallet of the generic type, this object is achieved in that protrusions that extend further upward are disposed on the upper side in such a manner that said protrusions partially are an upward continuation of the lateral walls. As a result, the tree seedlings are laterally supported, above all in the region of the soil region of said tree seedlings, and thus secured against falling over, but lateral rooting in this region is not impeded/compromised, or impeded/compromised to a lesser extent.

At least part of all the wells present can preferably have a rectangular cross section, preferably a square cross section, so that a particularly symmetrical disposal of the wells is possible. The cross section may however also deviate therefrom, for example be triangular or polygonal.

SUMMARY OF THE INVENTION

According to the invention, the well base can be formed by a grid having at least two intersecting webs which form a plurality of dewatering openings. Alternatively, other suitable shapes are possible, such as webs which point from the outside inward and terminate ahead of the center, for example. The lower edge of the web can be configured so as to be undulating such that clearances for the circulation of water are provided.

At least part of all the protrusions present can preferably be disposed in such a manner that the protrusions are disposed so as to be distributed uniformly along the circumference of the lateral wall of the well of which said protrusions are an upward continuation of the lateral walls, so that an ideally uniform support of the tree seedlings is provided above all in the region of the soil region of the latter.

In one preferred exemplary embodiment of the invention, at least part of all the wells present can be provided with a total of four protrusions which are disposed uniformly along the circumference of the lateral wall of the well. In the case of a well having a rectangular or square cross section, one protrusion is in this instance provided on each lateral face of the lateral wall. A protrusion, preferably each protrusion, of at least one well is in each case disposed so as to be centric in relation to one lateral face of the lateral wall of the well that is composed of a plurality of lateral faces.

In at least part of all the protrusions present, the height of these protrusions can preferably be greater than the height of the lateral wall of the well on the lateral wall of which the protrusions are disposed. The height here can be a multiple of the height of the lateral wall of the well on the lateral wall of which the protrusions are disposed.

In one preferred exemplary embodiment of the invention, in at least part of all the protrusions present the latter can extend inward somewhat beyond the lateral wall of each respective well, so that the tree seedlings are disposed so as to be centered in the well, and preferably have a lateral spacing from the lateral wall, or from each lateral face of the lateral wall, respectively.

The protrusions which extend inward somewhat beyond the lateral wall of each respective well here can continue downward along the lateral wall at least across a sub-region of the height of the lateral wall, preferably so as to reach the well base.

According to the invention, at least one spacer, preferably also at least two spacers, can be provided on the upper side, said spacer/spacers being positioned in a distributed manner, particularly preferably disposed in corners of the plant pallet, and extending upward by a multiple of the protrusions. These spacers guarantee a positive stacking capability, on the one hand, and ensure that an overturned plant pallet lying upside down bears on the spacers, thus no load which could cause damage bears on the tree seedlings, on the other hand.

In order for the spacers to be assembled, the plant pallet can be provided with attachment elements which are molded so as to project on the upper side, and the spacers on the lower side can have a correspondingly configured attachment recess which for releasably attaching the spacer to such an attachment element interacts in each case in a form-fitting manner with one attachment element.

The conversed shaping is also possible, in which the plant pallet is provided with attachment recesses which are disposed in the upper side and extend downward through the upper side, and the spacers on the lower side have a correspondingly configured attachment element which for releasably attaching the spacer to such an attachment recess interacts in each case in a form-fitting manner with one attachment recess.

Attachment recesses, or attachment elements, respectively, can advantageously be provided on the lower side of the plant pallet for a positive stacking capability of a plurality of plant pallets.

At least one spacer disposed in a corner of the plant pallet can be configured in such a manner that the cross section of said spacer widens in the direction toward at least one, preferably adjacent, corner of the plant pallet as the spacing from the upper side increases. Said spacer can thus be provided in a space-saving manner, but has an enlarged face on the upper side and a positive stability. The attachment recesses and the attachment elements which interact in a form-fitting manner with the former here can be configured in such a manner that the spacers can be attached exclusively in the intended orientation. This can be implemented by a corresponding shape of the attachment recesses and attachment elements, for example.

At least one spacer can also be provided with a bearing face on the upper side so as to guarantee a better distribution of force.

In the simplest case, a spacer can be configured as a post or tube which is plugged into a corresponding recess. In the case of a trapezoidal shape, for example, only one orientation is possible in this instance.

The invention furthermore relates to a system for receiving foliated small tree seedlings, having at least one plant pallet. In order for the disadvantages mentioned at the outset to be avoided, at least one plant pallet according to the invention in a water-tight and at least partially light-permeable tray is to be provided in a system of this type wherein the tray on the upper side is able to be closed with a film which is only gas-permeable and moisture-permeable. This prevents the ingress of pests, preferably also microorganisms, and moreover regulates the climate within the interior in which the tree seedlings are disposed and which is enclosed by the tray and the film.

In the intended use of the system, small tree seedlings can be disposed so as to be distributed in the wells in the plant pallet here.

The height of the spacer can advantageously correspond to at least the anticipated size of the tree seedlings during the dwell period in the plant pallet, so that the tree seedlings during the dwell period are protected by the spacers of higher configuration.

BRIEF DESCRIPTION OF THE DRAWINGS

An exemplary embodiment of the invention which is illustrated in the drawing will be explained hereunder. In the drawing.

DETAILED DESCRIPTION OF THE PREFERRED EMBODIMENT(S)

The same reference signs are used for identical or equivalent components in all figures.

Figure 1:
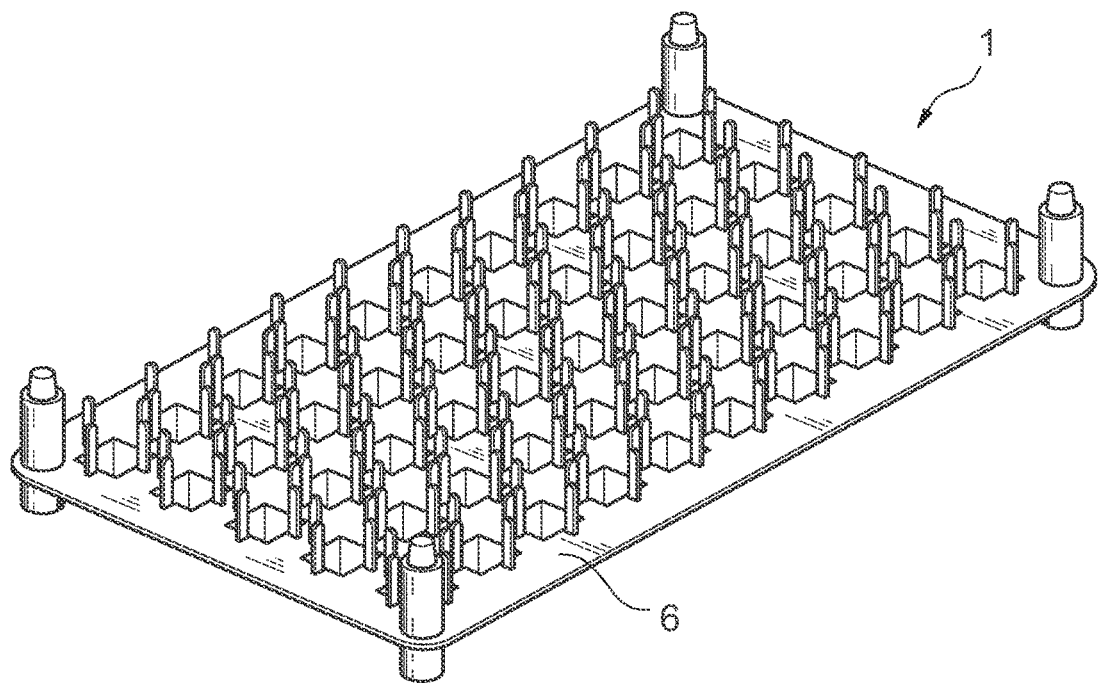
FIG. 1 shows a plant pallet according to the invention in a perspective view from above.

FIG. 1 shows a plant pallet 1 having a multiplicity of wells 2 which for receiving foliated small tree seedlings, the latter not being illustrated for reasons of clarity, are disposed in rows and columns.

Figure 3:
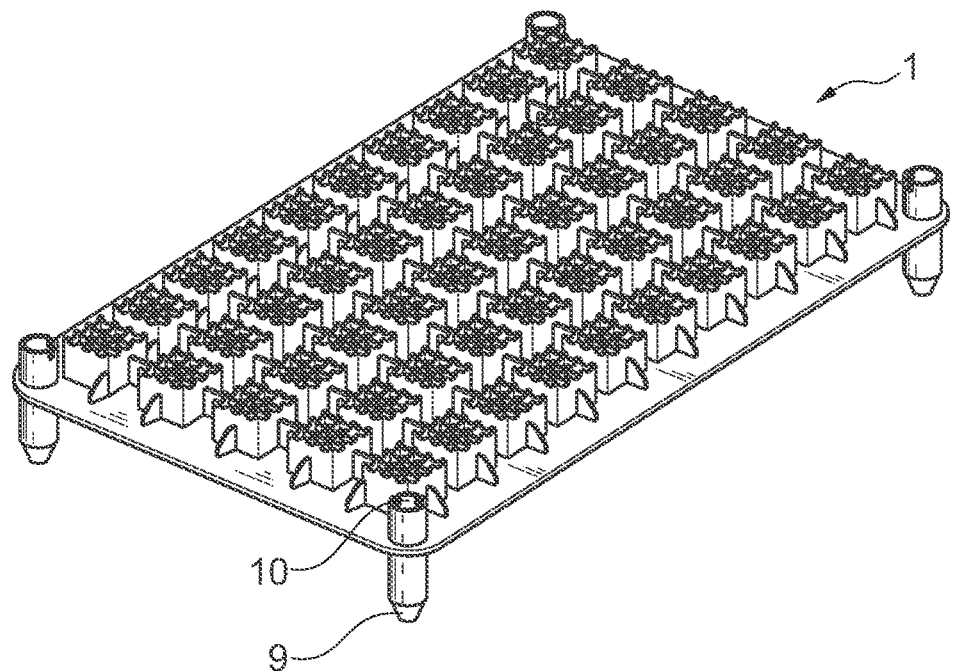
FIG. 3 shows the lower side of the subject matter according to FIG. 1 in a perspective view.
Figure 4:
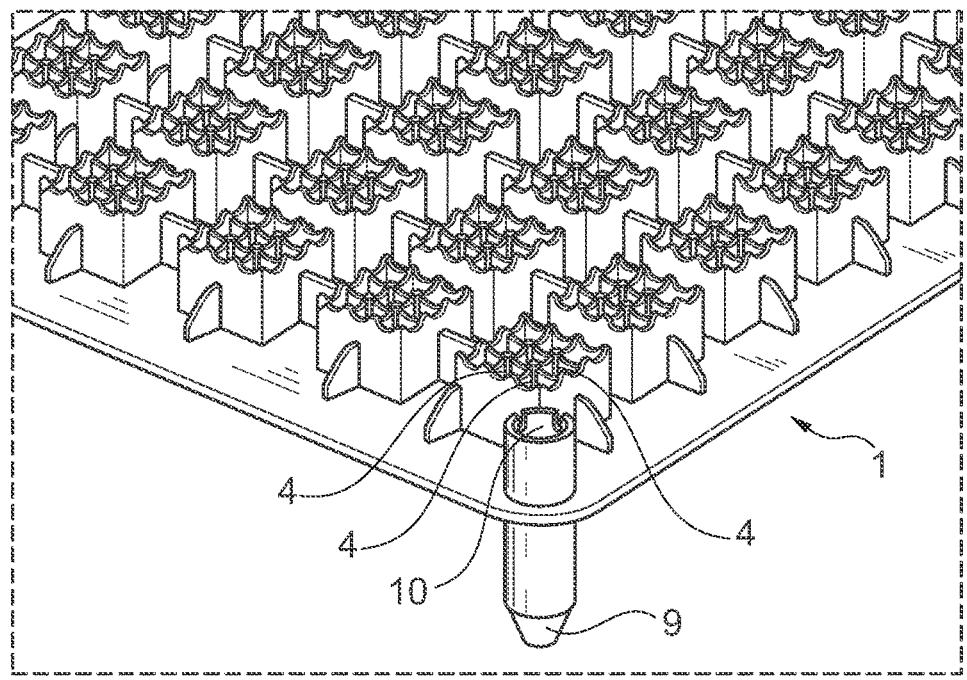
FIG. 4 shows a detailed view of the subject matter according to FIG. 3.

As can be seen from FIGS. 3 and 4, the wells 2 have in each case a well base 3 having a plurality of dewatering openings 4. To this end, the well base 3 is formed by a grid having four intersecting webs which form nine dewatering openings 4.

Figure 2:
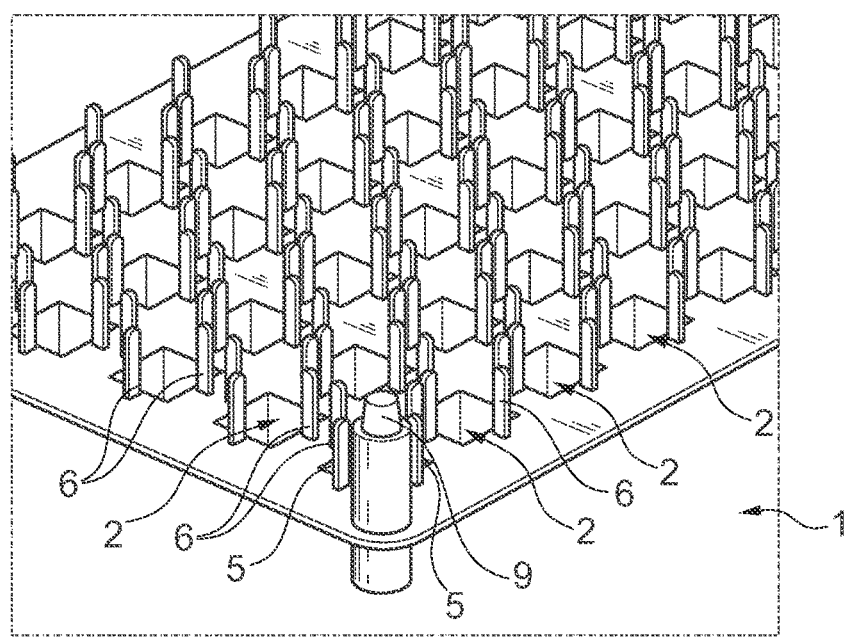
FIG. 2 shows a detailed view of the subject matter according to FIG. 1.

It can be seen in FIG. 2 that the well base 3 of each well 2 laterally transitions to an encircling lateral wall 5, and an upper side 6 of the plant pallet 1 is formed by mutually transitioning lateral walls 5 of adjacent wells 2. The lateral wall 5 here can comprise a plurality of lateral faces.

Protrusions 7 which extend further upward are disposed on the upper side 6 in such a manner that said protrusions 7 partially are an upward continuation of the lateral walls 5. As a result thereof, the tree seedlings are laterally supported, above all in the region of the soil region of said tree seedlings, and thus secured against falling over, but lateral rooting in this region is not impeded/compromised, or at least impeded/compromised to a lesser extent.

The wells 2 present have in each case a square cross section so that a particularly symmetrical disposal of the wells 2 as possible.

The protrusions 7 here are disposed in such a manner that said protrusions 7 are disposed so as to be distributed uniformly along the circumference of the lateral wall 5 of the well 2 of which said protrusions 7 are an upward continuation of the lateral walls 5.

A protrusion which in each case is disposed so as to be centric in relation to the corresponding lateral face is thus provided on each lateral face of the lateral wall.

The height of the protrusions 7 here is greater than the height of the lateral wall 5 of the wells 2, in the exemplary embodiment shown approximately 1.5 times greater.

Figure 5:
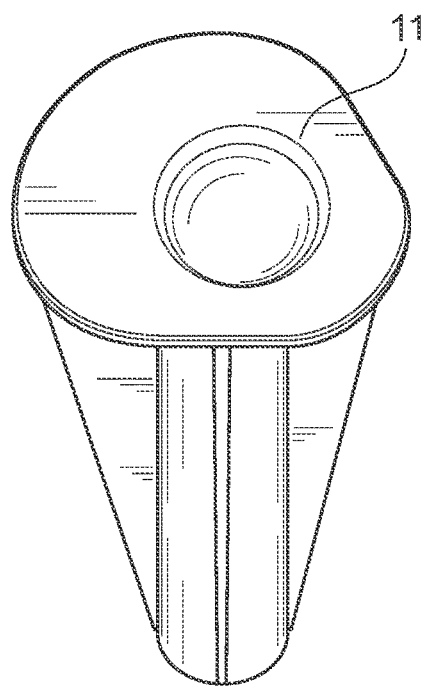
FIG. 5 shows a spacer according to the invention in a perspective view from above.

As is shown in FIG. 5, a spacer/spacers 8 which is/are disposed in the corners of the plant pallet 1 and extends/extends upward by a multiple of the protrusions 7 is/are provided on the upper side 6. Said spacers guarantee a positive stacking capability, on the one hand, and ensure that an overturned plant pallet lying upside down bears on the spacers 8, thus no load which could cause damage bears on the tree seedlings, on the other hand.

Figure 6:
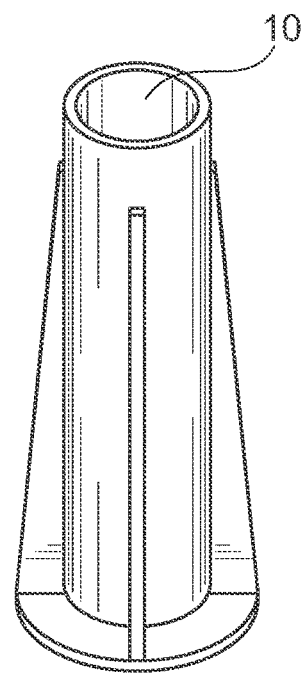
FIG. 6 shows the lower side of the subject matter according to FIG. 1 in a perspective view.

In order for the spacers 8 to be assembled, the plant pallet 1 is provided with attachment elements 9 (cf. FIG. 2) which are molded so as to project on the upper side, and the spacers 8 on the lower side have a correspondingly configured attachment recess 10 which for releasably attaching the spacer 8 to such an attachment element 9 interacts in each case in a form-fitting manner with one attachment element 9 (cf. FIG. 6).

Figure 7:
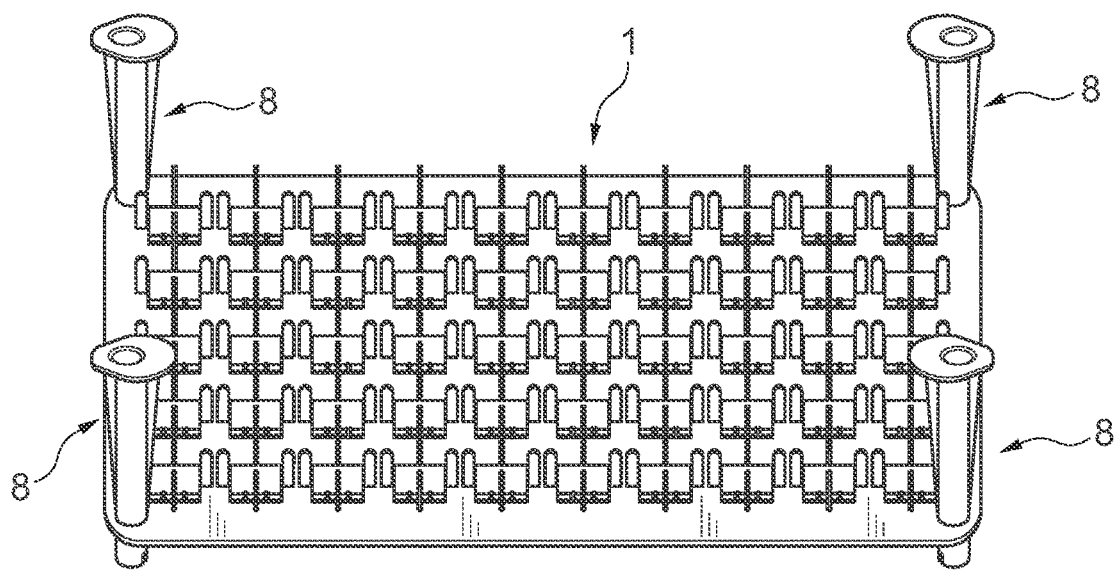
FIG. 7 shows the subject matter according to FIG. 1 with attached spacers.
Figure 8:
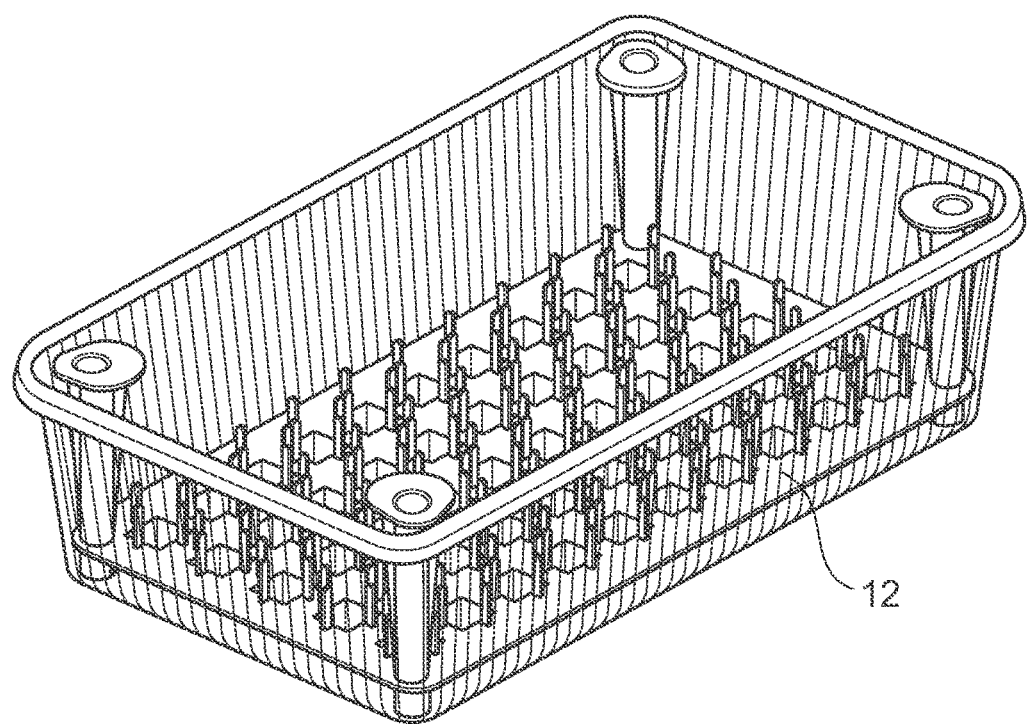
FIG. 8 shows a system according to the invention.

As is shown in FIGS. 5 to 7, the spacers 8 are configured in such a manner that the cross section of said spacers 8 widens in the direction toward all other corners of the plant pallet 1 as the spacing from the upper side 6 increases. The attachment recesses 10 and the attachment elements 9 which interact in a form-fitting manner with the former here are configured in such a manner that it is possible for the spacers 8 to be attached exclusively in the intended orientation. This is implemented by corresponding shape of the attachment recesses 10 and attachment elements 9 (cf. FIG. 2 as well as FIG. 6).

The spacers 8 are provided with a bearing face 11 on the upper side so as to guarantee a better distribution of force.

The system according to the invention in the exemplary embodiment shown comprises a plant pallet 1 which is provided in a water-tight and light-permeable tray 12, whereby the tray on the upper side is able to be closed with a film (not illustrated in the drawing) which is only gas-permeable and moisture-permeable.

The height of the spacers 8 here corresponds to at least the anticipated size of the tree seedlings during the dwell period in the plant pallet 1, so that the tree seedlings during the dwell period are protected by the spacers 8 of higher configuration. The height of the tray 12 is also chosen in an analogous manner Furthermore, the height of the spacers 8 corresponds to the height of the tray and thus terminates on the upper side 5 so as to be flush with the periphery of the tray 12.

The invention claimed is:

1. A plant pallet (1) having a multiplicity of wells (2) which for receiving foliated small tree seedlings are disposed in rows and columns, wherein the wells (2) have in each case a well base (3) having at least one dewatering opening (4), and wherein the well base (3) of each well (2) laterally transitions to an encircling lateral wall (5), and an upper side (6) of the plant pallet (1) is formed by mutually transitioning lateral walls (5) of adjacent wells (2), wherein protrusions (7) that extend further upward are disposed on the upper side (6) in such a manner that said protrusions (7) partially are an upward continuation of the lateral walls (5), wherein at least one spacer (8), is provided on the upper side (6), said spacer/spacers (8) being positioned in a distributed manner and extending upward by a multiple of the protrusions (7), wherein in at least part of all the protrusions (7) present the latter extend inward somewhat beyond the lateral wall (5) of each respective well (2), and wherein the protrusions (7) which extend inward somewhat beyond the lateral wall (5) of each respective well (2) continue downward along the lateral wall (5) at least across a sub-region of the height of the lateral wall (5) and wherein the plant pallet (1) is provided with attachment elements (9) which are molded so as to project on the upper side, and the spacers (8) on the lower side have a correspondingly configured attachment recess (10) for releasably attaching the spacer (8) to such an attachment element (9) interacts in each case in a form-fitting manner with one attachment element (9) and wherein the plant pallet (1) is provided with attachment recesses (10) which are disposed in the upper side (6) and extend downward through the upper side (6), and the spacers (8) on the lower side have a correspondingly configured attachment element (9) which for releasably attaching the spacer (8) to such an attachment recess (10) interacts in each case in a form-fitting manner with one recess (10).

2. The plant pallet (1) as claimed in claim 1, wherein at least part of all the wells (2) have a rectangular cross section, preferably a square cross section.

3. The plant pallet (1) as claimed in claim 2, wherein the well base (3) is formed by a grid having at least two intersecting webs which form a plurality of dewatering openings (4).

4. The plant pallet (1) as claimed in claim 2, wherein in at least part of all the protrusions (7) the height of these protrusions (7) is greater than the height of the lateral wall (5) of the well (2) on the lateral walls of which the protrusions (7) are disposed.

5. The plant pallet (1) as claimed in claim 1, wherein the well base (3) is formed by a grid having at least two intersecting webs which form a plurality of dewatering openings (4).

6. The plant pallet (1) as claimed in claim 5, wherein at least part of all the protrusions (7) are disposed in such a manner that the protrusions (7) are disposed so as to be distributed uniformly along the circumference of the lateral wall (5) of the well (2) of which said protrusions (7) are an upward continuation of the lateral walls (5).

7. The plant pallet (1) as claimed in claim 6, wherein at least part of all the wells (2) are provided with a total of four protrusions (7) which are disposed uniformly along the circumference of the lateral wall (5) of the well (2).

8. The plant pallet (1) as claimed in claim 1, wherein in at least part of all the protrusions (7) present the height of these protrusions (7) is greater than the height of the lateral wall (5) of the well (2) on the lateral walls of which the protrusions (7) are disposed.

9. The plant pallet (1) as claimed in claim 1, wherein at least one spacer (8) disposed in a corner of the plant pallet (1) is configured in such a manner that the cross section of said spacer (8) widens in the direction toward at least one corner of the plant pallet (1) as the spacing from the upper side (6) increases.

10. The plant pallet (1) as claimed in claim 1, wherein at least one spacer (8) on the upper side is provided with a bearing face (11).

11. A system for receiving foliated small tree seedlings, having at least one plant pallet (1), wherein at least one plant pallet (1) as claimed in claim 1 is provided in a water-tight and at least partially light-permeable tray (12), wherein the tray (12) on the upper side is able to be closed with a film which is only gas-permeable and moisture-permeable.

12. A system having a plant pallet (1) and small tree seedlings disposed therein, wherein the plant pallet (1) is configured as claimed in claim 1.

13. The system as claimed in claim 12, wherein the height of the spacers (8) corresponds to at least the anticipated size of the tree seedlings during the dwell period in the plant pallet (1).

14. A system for receiving foliated small tree seedlings, having at least one plant pallet (1), wherein at least one plant pallet (1) as claimed in claim 2 is provided in a water-tight and at least partially light-permeable tray (12), wherein the tray (12) on the upper side is able to be closed with a film which is gas-permeable and moisture-permeable.

15. A system for receiving foliated small tree seedlings, having at least one plant pallet (1), wherein at least one plant pallet (1) as claimed in claim 3 is provided in a water-tight and at least partially light-permeable tray (12), wherein the tray (12) on the upper side is able to be closed with a film which is gas-permeable and moisture-permeable.

16. A system for receiving foliated small tree seedlings, having at least one plant pallet (1), wherein at least one plant pallet (1) as claimed in claim 4 is provided in a water-tight and at least partially light-permeable tray (12), wherein the tray (12) on the upper side is able to be closed with a film which is gas-permeable and moisture-permeable.

17. A system for receiving foliated small tree seedlings, having at least one plant pallet (1), wherein at least one plant pallet (1) as claimed in claim 5 is provided in a water-tight and at least partially light-permeable tray (12), wherein the tray (12) on the upper side is able to be closed with a film which is gas-permeable and moisture-permeable.

18. A system for receiving foliated small tree seedlings, having at least one plant pallet (1), wherein at least one plant pallet (1) as claimed in claim 6 is provided in a water-tight and at least partially light-permeable tray (12), wherein the tray (12) on the upper side is able to be closed with a film which is gas-permeable and moisture-permeable.

* * * * *